(12) United States Patent
Ke

(10) Patent No.: US 10,316,157 B2
(45) Date of Patent: Jun. 11, 2019

(54) MODIFIED POLYIMIDE THIN FILM AND MANUFACTURING METHOD THEREOF

(71) Applicant: Wuhan China Star Optoelectronics Technology Co., Ltd., Wuhan, Hubei (CN)

(72) Inventor: Linbo Ke, Guangdong (CN)

(73) Assignee: Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 3 days.

(21) Appl. No.: 15/544,334

(22) PCT Filed: Apr. 26, 2017

(86) PCT No.: PCT/CN2017/082048
§ 371 (c)(1),
(2) Date: Jul. 18, 2017

(87) PCT Pub. No.: WO2018/171000
PCT Pub. Date: Sep. 27, 2018

(65) Prior Publication Data
US 2018/0273711 A1    Sep. 27, 2018

(51) Int. Cl.
| | |
|---|---|
| B29L 7/00 | (2006.01) |
| C08J 5/18 | (2006.01) |
| B29C 41/00 | (2006.01) |
| B29C 41/02 | (2006.01) |
| B29C 41/46 | (2006.01) |
| B29K 79/00 | (2006.01) |
| C08G 73/10 | (2006.01) |

(52) U.S. Cl.
CPC ............. *C08J 5/18* (2013.01); *B29C 41/003* (2013.01); *B29C 41/02* (2013.01); *B29C 41/46* (2013.01); *C08G 73/1078* (2013.01); *B29K 2079/08* (2013.01); *B29K 2909/08* (2013.01); *B29L 2007/008* (2013.01); *C08J 2379/08* (2013.01)

(58) Field of Classification Search
None
See application file for complete search history.

(56) References Cited

FOREIGN PATENT DOCUMENTS

| CN | 102807675 A | 12/2012 |
| CN | 103044916 A | 4/2013 |
| CN | 103788650 A | 5/2014 |
| CN | 105037727 A | 11/2015 |
| CN | 106164178 A | 11/2016 |

*Primary Examiner* — Ana L. Woodward
(74) *Attorney, Agent, or Firm* — Andrew C. Cheng

(57) ABSTRACT

Disclosed are a modified polyimide thin film and a manufacturing method thereof applied for colorless transparent flexible display technology. A material of the modified polyimide thin film has a following structural formula:

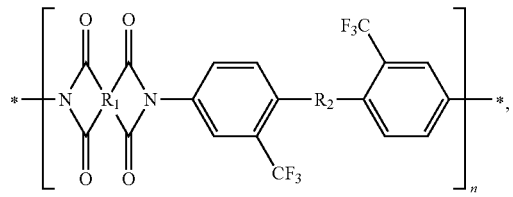

wherein

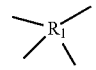

is selected from one of

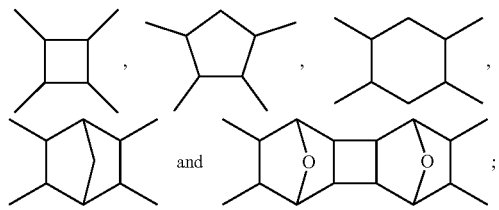

—R2— is selected from one of —O—,

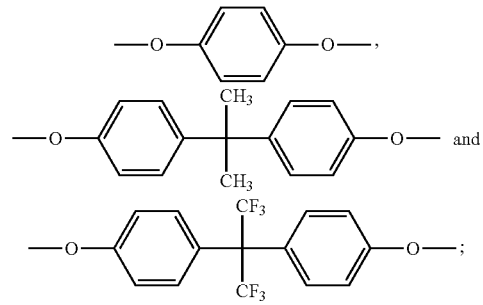

n is a degree of polymerization and n is a natural number. The obtained film possesses good heat resistance, excellent colorlessness and flexibility.

7 Claims, No Drawings

MODIFIED POLYIMIDE THIN FILM AND MANUFACTURING METHOD THEREOF

CROSS REFERENCE

This application claims the priority of Chinese Patent Application No. 201710179534.9, entitled "Modified polyimide thin film and manufacturing method thereof", filed on Mar. 23, 2017, the disclosure of which is incorporated herein by reference in its entirety.

FIELD OF THE INVENTION

The present invention relates to a transparent flexible display technology field, and more particularly to a modified polyimide thin film and a manufacturing method thereof.

BACKGROUND OF THE INVENTION

With the rapid development of the modern optoelectronic technology, the display technology is developed for being lighter, thinner, more flexible and more transparent. The thin film substrate made of polymer material possesses the characteristics of light weight, flexibility, transparency and excellent comprehensive performance, which can meet the requirements of display technology well.

The most promising polymer material for the flexible substrate should polyimide (PI). Polyimide has excellent heat resistance, radiation resistance, chemical resistance, electrical insulation and mechanical properties. However, the traditional commercial PI film is brown. Mainly it is because the strong spectral absorption of the charge transfer complex (CTC) in or among molecules generated by the electron-withdrawing action of the alternating dianhydride residue and the electron-donating action of the diamine residue in the macromolecule main chain, which significantly restricts the application in transparent flexible display technology. Therefore, for obtaining a colorless transparent polyimide based material, it must be modified to weaken or eliminate the influence of CTC.

SUMMARY OF THE INVENTION

On this account, in the present invention, the aliphatic dianhydride monomer is copolymerized with the 4-(10-Methylundecyl)benzenesulfonic acid monomer to prepare a modified polyimide thin film. The flexibility, the colorless transparency and the visible light transmittance can be improved while maintaining the good heat resistance. The modified polyimide thin film can be used as a substrate material for the transparent flexible display technology.

First, the present invention provides a manufacturing method of a modified polyimide thin film, comprising steps of:

Step 1, dissolving aliphatic dianhydride represent by formula (I) and 4-(10-Methylundecyl)benzenesulfonic acid represent by formula (II) in an aprotic polar solvent and implementing copolymerization reaction under nitrogen atmosphere for 2 to 10 hours to obtain a reaction solution;

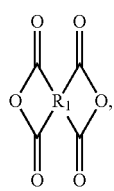

(I)

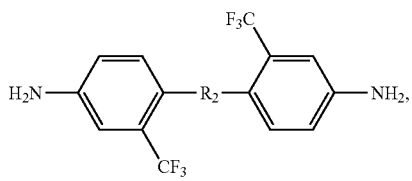

(II)

Wherein

is selected from one of

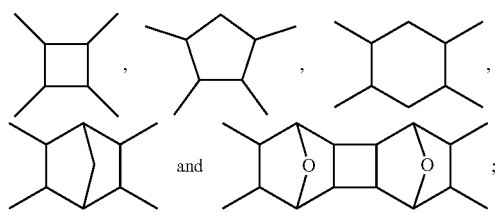

—R2— is selected from one of —O—,

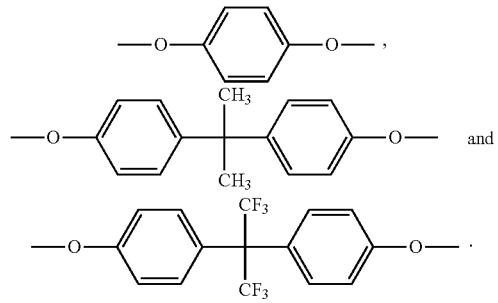

Step 2, coating the reaction solution on a clean and smooth glass substrate in a nitrogen atmosphere; and baking the reaction solution in a vacuum atmosphere at 50 to 120 Celsius degrees to form a film;

Step 3, heating and curing the film obtained in Step 2 starting from 80 to 120 Celsius degrees in a nitrogen atmosphere, stripping the film off from the glass substrate after being cooled to a room temperature to obtain the modified polyimide thin film.

In Step 1, a temperature of the copolymerization is 10 to 40 Celsius degrees. Preferably, a temperature of the copolymerization is 15 to 30 Celsius degrees.

In Step 1, the aprotic polar solvent is selected from one or more of N, N-dimethylformamide (DMF), N, N-dimethylacetamide (DMAC), N-methyl-2-pyrrolidone (NMP) and dimethyl sulfoxide (DMSO).

A molar ratio of the aliphatic dianhydride and the 4-(10-Methylundecyl)benzenesulfonic acid is 1:(0.95 to 1.05). Preferably, a molar ratio of the aliphatic dianhydride and the 4-(10-Methylundecyl)benzenesulfonic acid is 1:1.

Preferably, in Step 2, the method further comprises a step of: implementing a vacuum degassing treatment to the reaction solution for 12 to 24 hours before coating the reaction solution on the glass substrate. The vacuum degassing treatment is implemented in the condition of stirring. The degassing treatment can facilitate subsequent formation of a flat, bubble-free film surface on the glass substrate.

Preferably, in Step 2, a coating thickness of the reaction solution coated on the glass substrate is 50 to 200 μm.

In Step 2, a time of baking is 4 to 10 minutes. The purpose of baking is to volatilize the solvent in the reaction solution. By baking and vacuuming at the same time in the vacuum condition, the volatile solvent does not drip to the surface of the thin film due to cooling to room temperature; then, as heating and curing in the following Step 3, the solvent has been basically does not exist, so only the high temperature curing in nitrogen is required without vacuuming.

Preferably, in Step 2, a temperature of baking the reaction solution to form the film is 90 to 115 Celsius degrees.

Preferably, in Step 3, a starting temperature of heating and curing the film is 90 to 115 Celsius degrees. In the present application, as heating and curing, the experimental equipment such as oven with nitrogen protection is first heated to a starting temperature of heating and curing (such as 90, 100 or 110 Celsius degrees). Then, the thin film obtained in Step 2 is located in the oven with such temperature and heating and curing starts according to the default procedure.

Preferably, in Step 3, the method of heating and curing is one of hot-air heating and infrared heating.

Preferably, in Step 3, a temperature of curing is 360 to 450 Celsius degrees and a time of curing is 10 to 60 minutes.

In the present invention, the temperature of 360 to 450 Celsius degrees is selected as the curing temperature. First, the quality loss of the thin film cured at this temperature is less. Second, the high temperature resistance of the modified PI thin film is enhanced in advance by curing in this temperature. When the modified polyimide thin film obtained in the following is mainly used for the production of the flexible thin film substrate. The temperature of process can be up to 400 Celsius degrees. The high temperature resistant modified polyimide thin film is more conducive to the application.

Preferably, in Step 3, a temperature rising rate of curing is 10 to 20 Celsius degrees/minute.

The method further comprises a step of incubating the film obtained in Step 2 at 120 Celsius degrees for 15 to 30 minutes before heating and curing the film obtained in Step 2 starting from 80 to 120 Celsius degrees. The incubation can ensure that the residual solvent can be completely volatilized in advance.

Preferably, in Step 3, a method of stripping the film off is laser stripping or mechanical stripping. Specifically, the mechanical stripping is manual tearing.

In the present invention, in Step 1, the reaction solution comprises polyamic acid, of which the structural formula is:

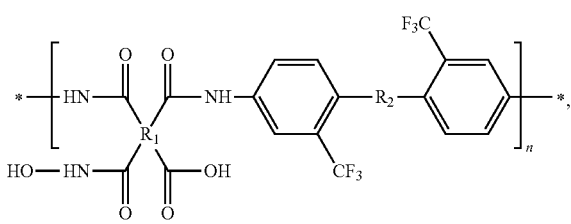

n is a degree of polymerization and n is a natural number.

Furthermore, n is a natural number of 1 to 1000. Preferably, n is a natural number of 100 to 1000. For instance, n can be 200, 300, 400, 500, 600, 700, 800 or 900.

In the present invention, in Step 3, a chemical formula of a material of the modified polyimide thin film after heating and curing is represented by a following formula (III):

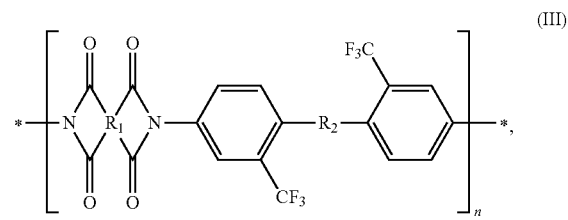

wherein

is selected from one of

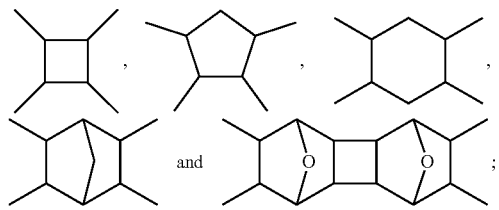

—R2- is selected from one of —O—,

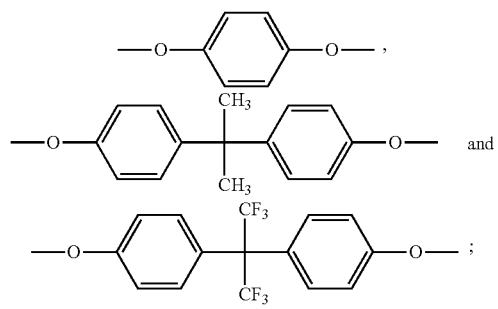

n is a degree of polymerization and n is a natural number.

Furthermore, n is a natural number of 1 to 1000.

In the manufacturing method of the modified polyimide thin film first provided by the present invention, the cyclic aliphatic dianhydride monomer represent by formula (I) is copolymerized with the 4-(10-Methylundecyl)benzenesulfonic acid monomer represent by formula (II) to obtain a reaction solution containing polyamic acid. Then, through the unique thermal imidization process (vacuum baking at 50 to 120 Celsius degrees and then heating and curing starting from 80 to 120 Celsius degrees) and the stripping process, the modified polyimide thin film is obtained. The reaction process is:

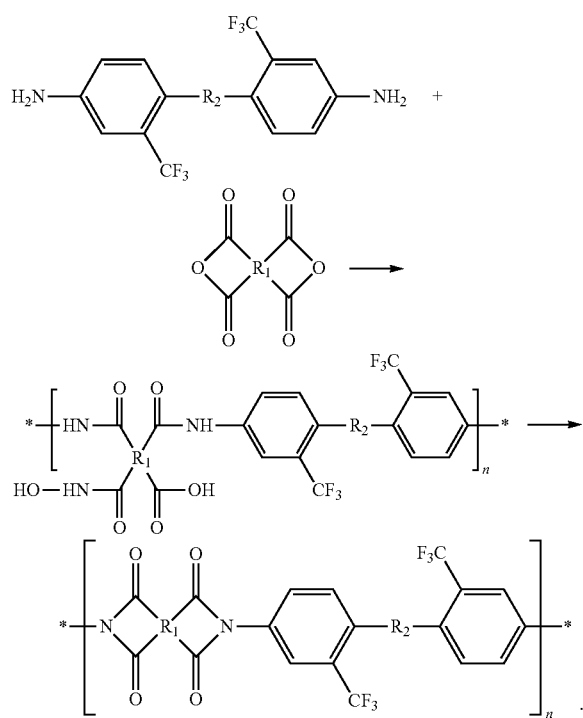

In the aliphatic dianhydride, an alicyclic structure is used to replace a usual aromatic ring structure and can effectively break the conjugation of the final product polyimide molecules for reducing the probability of CTC formation to improve the colorlessness of the material and to show the excellent flexibility. 4-(10-Methylundecyl)benzenesulfonic acid monomeric molecules is introduced with a trifluoromethyl group (—CF3) and a group R2 having an ether bond (—O—) for having a strong electron-withdrawing property and the conjugation of the final product polyimide molecules for effectively reducing the CTC formation to significantly improve the colorlessness of the polyimide thin film and the solubility and the thermal stability of the polyimide thin film. Accordingly, the polyimide thin film obtained by the present invention can have better good heat resistance and show the flexibility, the colorless transparency and the visible light transmittance, which are more excellent. The production method is simple and easy. The reaction degree can be controlled. The modified polyimide film has a smooth surface. The solvent residue is low and the purity is high to achieve the industrial production.

Second, the present invention provides a modified polyimide thin film, wherein a chemical formula of a material of the modified polyimide thin film is represented by a following formula (III):

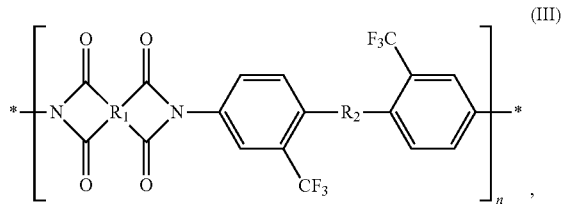

wherein

is selected from one of

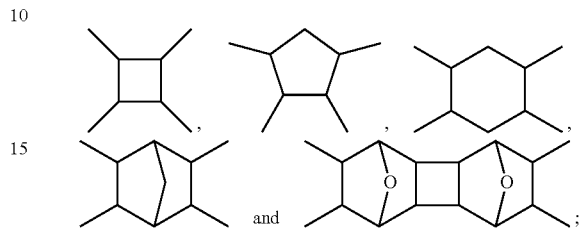

—R2- is selected from one of —O—,

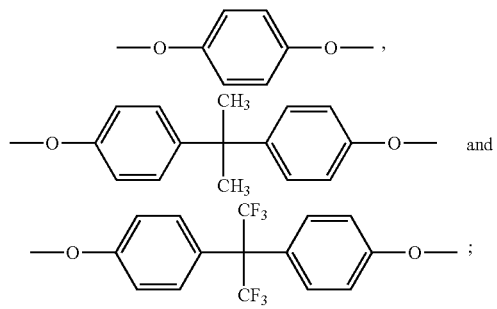

n is a degree of polymerization and n is a natural number.

Furthermore, n is a natural number of 1 to 1000.

Preferably, n is a natural number of 100 to 1000. For instance, n can be 200, 300, 400, 500, 600, 700, 800 or 900.

The modified polyimide thin film second provided by the present invention us produced by the aforesaid method of the present invention. The modified polyimide thin film can have better good heat resistance and show the flexibility, the colorless transparency and the visible light transmittance, which are more excellent. The modified polyimide thin film can be used as a substrate material for the transparent flexible display technology.

The benefits of the present invention comprise the following:

First, the cyclic aliphatic dianhydride monomer represent by formula (I) is copolymerized with the 4-(10-Methylundecyl)benzenesulfonic acid monomer represent by formula (II) to obtain a reaction solution containing polyamic acid. Then, through the unique thermal imidization process and the stripping process, the modified polyimide thin film is obtained. The production method is simple and easy. The reaction degree can be controlled. The product purity is high and the solvent residue is low. The modified polyimide film has a smooth surface and can achieve the industrial production.

Second, in the of the modified polyimide thin film, the alicyclic structure and the aromatic structure having the ether bond (—O—) and the trifluoromethyl group can effectively eliminate the formation of charge transfer complex (CTC) in or among molecules of modified polyimide to improve the colorlessness, the solubility and the thermal stability of the material for showing a better flexibility.

The advantages of the invention will be set forth in part in the following specification. A part will be obvious from the specification or may be learned by practice of the embodiments of the invention.

DETAILED DESCRIPTION OF PREFERRED EMBODIMENTS

Embodiments of the present invention are described in detail with the technical matters, structural features, achieved objects, and effects with reference to the accompanying drawings as follows. It is clear that the described embodiments are part of embodiments of the present invention, but not all embodiments. Based on the embodiments of the present invention, all other embodiments to those of ordinary skill in the premise of no creative efforts obtained, should be considered within the scope of protection of the present invention.

The First Embodiment

A manufacturing method of a colorless transparent flexible polyimide thin film, comprises steps of:

1. In room temperature, 0.01 mol of 1,2,3,4-cyclobutanetetracarboxylic dianhydride (CBDA) and 0.01 mol of 2,2'-bistrifluoromethyl-4,4'-diaminodiphenyl ether (TFODA) are dissolved in 250 mL of N-methyl-2-pyrrolidone (NMP) and then are added into an autoclave to be fully stirred in nitrogen atmosphere protection. The control temperature is 30 Celsius degrees. The polyamic acid solution is obtained after reaction of 6 hours.

2. After implementing a vacuum degassing treatment to the polyamic acid solution, the polyamic acid solution is coated on a clean and smooth glass substrate in a nitrogen atmosphere and a coating thickness is controlled to be 150 μm.

3. The aforesaid glass substrate is baked at 50 Celsius degrees for 10 minutes in a vacuum atmosphere so that the solvent NMP volatiles and is separated.

4. In a nitrogen atmosphere, the glass substrate is incubated at 120 Celsius degrees for 30 minutes and then, the temperature is rose from 120 Celsius degrees to 400 Celsius degrees with a temperature rising rate of 10 Celsius degrees/minute for curing the thin film for 30 minutes. Then, the temperature drops to the room temperature by the circulating cooling water.

5. The thin film is stripped from the glass substrate by laser stripping to obtain a colorless transparent modified polyimide thin film with certain flexibility.

The chemical formula of the modified polyimide thin film obtained in this embodiment is

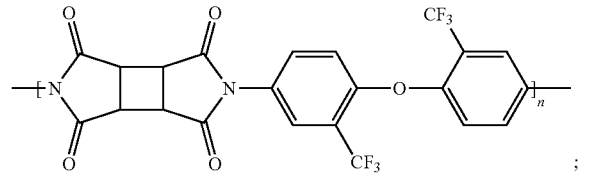

the degree of polymerization n is 1000 and in other embodiments, n can also be other positive integer, such as 250, 450 or 600; the ultra violet absorption cutoff wavelength of the modified polyimide thin film is 330 nm and the transmittance at 420 nm was 88%.

The Second Embodiment

A manufacturing method of a modified polyimide thin film, comprises steps of:

1. In room temperature, 0.01 mol of 2,3,5,6-bicyclo[2.2.1]heptanetetracarboxylic dianhydride and 0.01 mol of 2,2'-bistrifluoromethyl-4,4'-diaminodiphenyl ether are dissolved in 250 mL of N-methyl-2-pyrrolidone (NMP) and then are added into an autoclave to be fully stirred in nitrogen atmosphere protection. The control temperature is 20 Celsius degrees. The polyamic acid solution is obtained after reaction of 6 hours.

2. After implementing a vacuum degassing treatment to the polyamic acid solution, the polyamic acid solution is coated on a clean and smooth glass substrate in a nitrogen atmosphere and a coating thickness is controlled to be 100 μm.

3. The aforesaid glass substrate is baked at 60 Celsius degrees for 8 minutes in a vacuum atmosphere so that the solvent NMP volatiles and is separated.

4. In a nitrogen atmosphere, the glass substrate is incubated at 120 Celsius degrees for 20 minutes and then, the temperature is rose from 120 Celsius degrees to 450 Celsius degrees with a temperature rising rate of 20 Celsius degrees/minute for curing the thin film for 45 minutes. Then, the temperature drops to the room temperature by the circulating cooling water.

5. The thin film is stripped from the glass substrate by laser stripping to obtain a colorless transparent modified polyimide thin film with certain flexibility.

The chemical formula of the modified polyimide thin film obtained in this embodiment is

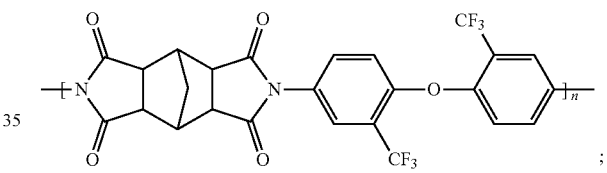

the degree of polymerization n is 800; the ultra violet absorption cutoff wavelength of the modified polyimide thin film is 313 nm and the transmittance at 420 nm was 91%.

The Third Embodiment

A manufacturing method of a modified polyimide thin film, comprises steps of:

1. In room temperature, 0.01 mol of 2,3,5,6-bicyclo[2.2.1]heptanetetracarboxylic dianhydride and 0.0095 mol of 1,4-bis(4-amino-2-trifluoromethylphenoxy)benzene are dissolved in 250 mL of N-methyl-2-pyrrolidone (NMP) and then are added into an autoclave to be fully stirred in nitrogen atmosphere protection. The control temperature is 20 Celsius degrees. The polyamic acid (PAA) solution is obtained after reaction of 6 hours.

2. After implementing a vacuum degassing treatment to the polyamic acid solution, the polyamic acid solution is coated on a clean and smooth glass substrate in a nitrogen atmosphere and a coating thickness is controlled to be 50 μm.

3. The aforesaid glass substrate is baked at 70 Celsius degrees for 4 minutes in a vacuum atmosphere so that the solvent NMP volatiles and is separated.

4. In a nitrogen atmosphere, the glass substrate is incubated at 120 Celsius degrees for 15 minutes and then, the temperature is rose from 120 Celsius degrees to 380 Celsius degrees with a temperature rising rate of 15 Celsius degrees/minute for curing the thin film for 60 minutes. Then, the temperature drops to the room temperature by the circulating cooling water.

5. The thin film is stripped from the glass substrate by laser stripping to obtain a colorless transparent modified polyimide thin film with certain flexibility.

The chemical formula of the modified polyimide thin film obtained in this embodiment is

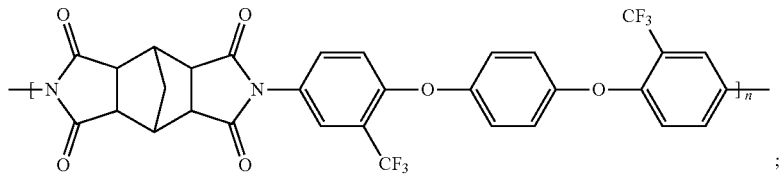

the degree of polymerization n is 350; the ultra violet absorption cutoff wavelength of the modified polyimide thin film is 302 nm and the transmittance at 420 nm was 90%.

The Fourth Embodiment

A manufacturing method of a colorless transparent flexible polyimide thin film, comprises steps of:

1. In room temperature, 1 mol of 1,2,4,5-cyclohexane tetracarboxylic dianhydride and 1.05 mol of 2,2-bis[4-(4-amino-2-trifluoromethylphenoxy) phenyl]propane is dissolved in 25 mL of dimethylformamide (DMF) and then are added into a woulff bottle to be fully stirred in nitrogen atmosphere protection. The control temperature is 20 Celsius degrees. The polyamic acid solution is obtained after reaction of 4 hours.

2. After implementing a vacuum degassing treatment to the polyamic acid solution, the polyamic acid solution is coated on a clean and smooth glass substrate in a nitrogen atmosphere and a coating thickness is controlled to be 60 μm.

3. The aforesaid glass substrate is baked at 70 Celsius degrees for 10 minutes in a vacuum atmosphere so that the solvent volatiles and is separated.

4. In a nitrogen atmosphere, the temperature is rose from 120 Celsius degrees to 380 Celsius degrees with a temperature rising rate of 8 Celsius degrees/minute for curing the thin film for 40 minutes. Then, the temperature drops to the room temperature by the circulating cooling water.

5. The thin film is stripped from the glass substrate by laser stripping to obtain a colorless transparent modified polyimide thin film with certain flexibility.

The chemical formula of the modified polyimide thin film obtained in this embodiment is:

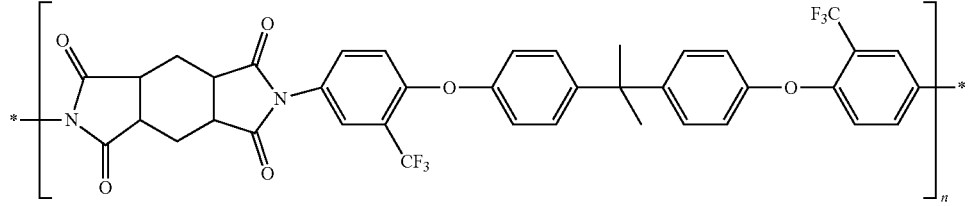

wherein n is 500; and the ultra violet absorption cutoff wavelength of the thin film is 301 nm and the transmittance at 420 nm was 92%.

Specifically, modifications and variations of the above-described embodiments may be made by those skilled in the art to which the present invention pertains, depending on the disclosure and description of the foregoing specification. Accordingly, the invention is not limited to the specific embodiments disclosed and described above, and some equivalent modifications and variations of the invention are intended to be within the scope of the appended claims. In addition, although some particular terms are used in this specification, these terms are for convenience of illustration only and are not intended to limit the invention any way.

What is claimed is:

1. A manufacturing method of a modified polyimide thin film, comprising steps of:

Step 1, dissolving aliphatic dianhydride represented by formula (I) and fluorinated aromatic diamine represented by formula (II) in an aprotic polar solvent and implementing copolymerization reaction under nitrogen atmosphere for 2 to 10 hours to obtain a reaction solution;

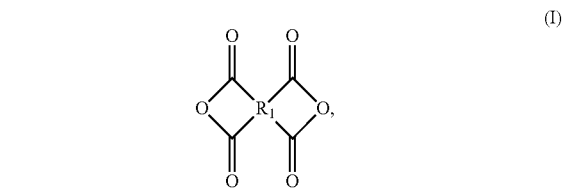

(I)

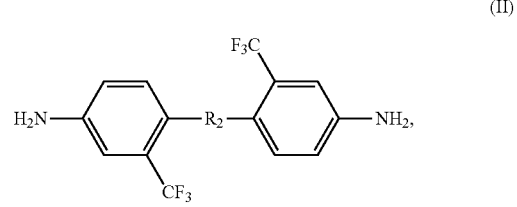

(II)

wherein

is selected from one of

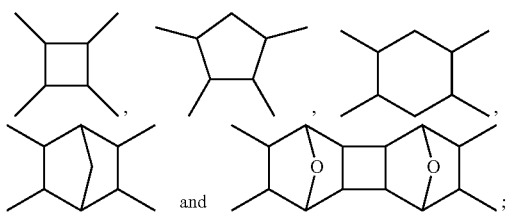

—R$_2$- is selected from one of —O—,

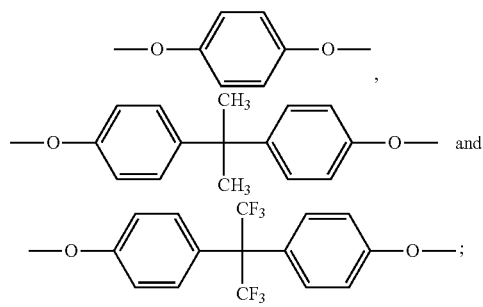

Step 2, implementing a vacuum degassing treatment to the reaction solution for 12 to 24 hours; then coating the reaction solution on a clean and smooth glass substrate in a nitrogen atmosphere; and baking the reaction solution in a vacuum atmosphere at 50 to 120 Celsius degrees to form a film; and Step 3, heating the film obtained in Step 2 at a temperature starting from 80 to 120 Celsius degrees in a nitrogen atmosphere; rising the temperature at a rate of 10 to 20 Celsius degrees/minute; curing the film at the temperature from 360 to 450 Celsius degrees and a time from 10 to 60 minutes; and stripping the film off from the glass substrate after being cooled to a room temperature to obtain the modified polyimide thin film of a transmittance at 420 nm not less than 88%.

2. The manufacturing method according to claim 1, wherein in Step 1, a temperature of the copolymerization is 10 to 40 Celsius degrees.

3. The manufacturing method according to claim 1, wherein in Step 2, a coating thickness of the reaction solution coated on the glass substrate is 50 to 200 μm.

4. The manufacturing method according to claim 1, wherein in Step 2, a time of baking is 4 to 10 minutes.

5. The manufacturing method according to claim 1, wherein in Step 3, the method further comprises a step of incubating the film obtained in Step 2 at 120 Celsius degrees for 15 to 30 minutes.

6. The manufacturing method according to claim 1, wherein in Step 1, a molar ratio of the aliphatic dianhydride and the fluorinated aromatic diamine is 1:(0.95 to 1.05).

7. The manufacturing method according to claim 1, wherein the aprotic polar solvent is selected from one or more of N,N-dimethylformamide, N,N-dimethylacetamide, N-methyl-2-pyrrolidone and dimethyl sulfoxide.

* * * * *